Oct. 28, 1924.

A. J. KRUGER 1,513,174

GRAIN SOAKER

Filed May 18, 1923

A. J. Kruger
INVENTOR

BY Victor J. Evans
ATTORNEY

Oct. 28, 1924.
A. J. KRUGER
GRAIN SOAKER
Filed May 18, 1923
1,513,174
2 Sheets-Sheet 2
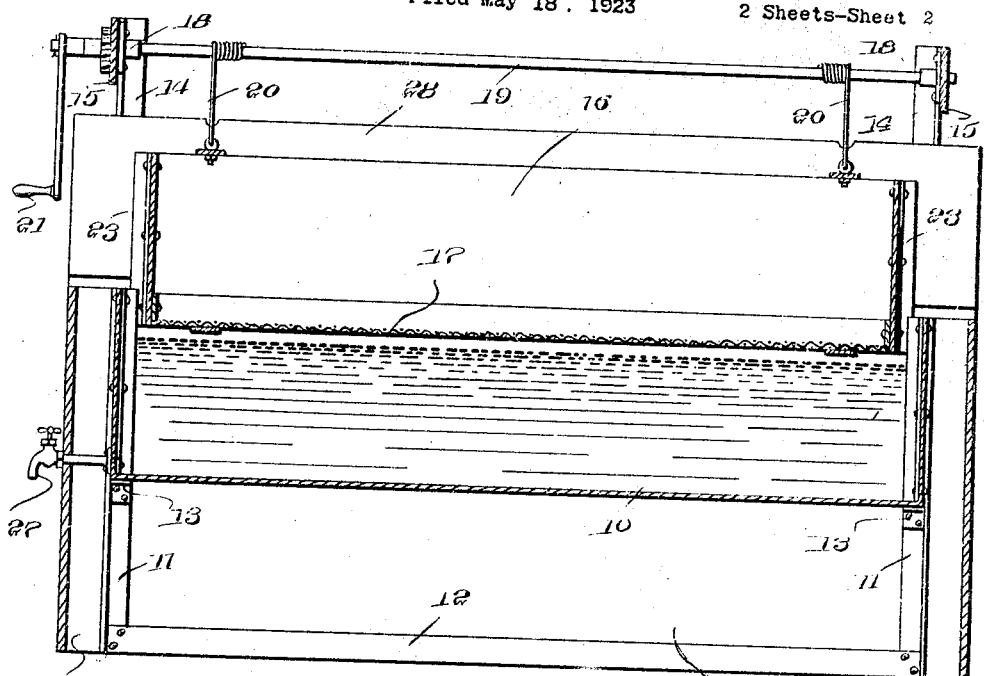
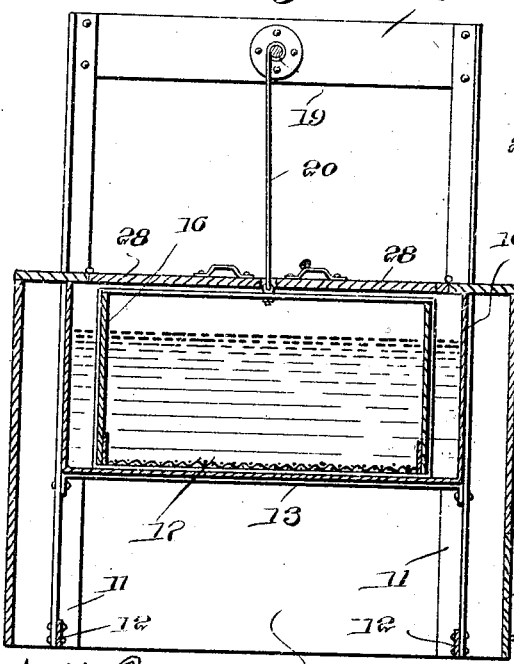
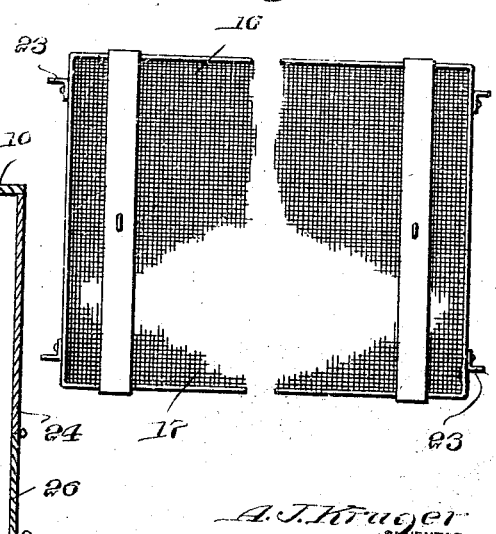
A. J. Kruger
INVENTOR
BY Victor J. Evans
ATTORNEY Patented Oct. 28, 1924.

1,513,174

UNITED STATES PATENT OFFICE.

AILT J. KRUGER, OF ADRIAN, MINNESOTA.

GRAIN SOAKER.

Application filed May 18, 1923. Serial No. 639,961.

*To all whom it may concern:*

Be it known that I, AILT J. KRUGER, a citizen of the United States, residing at Adrian, in the county of Nobles and State of Minnesota, have invented new and useful Improvements in Grain Soakers, of which the following is a specification.

This invention relates to improvements in apparatus for treating grain, an object being to provide means whereby corn, oats or other grain may be soaked for feeding animals, especially growing hogs.

Another object of the invention is the provision of a grain soaking apparatus, wherein the grain may be immersed in water for a proper period and afterward raised and permitted to drain.

Another object of the invention is the provision of an apparatus for the above purpose, from which the grain may be easily removed after treatment and the water conveniently drained from the apparatus so that the latter may be maintained in a proper sanitary condition.

With the above and other objects in view, the invention further includes the following novel features and details of construction, to be hereinafter more fully described, illustrated in the accompanying drawings and pointed out in the appended claim.

In the drawings:—

Figure 3 is a transverse sectional view.

Figure 4 is a central longitudinal section with the grain container in elevated position.

Figure 5 is a plan view of one of the removable closures.

Figure 1:
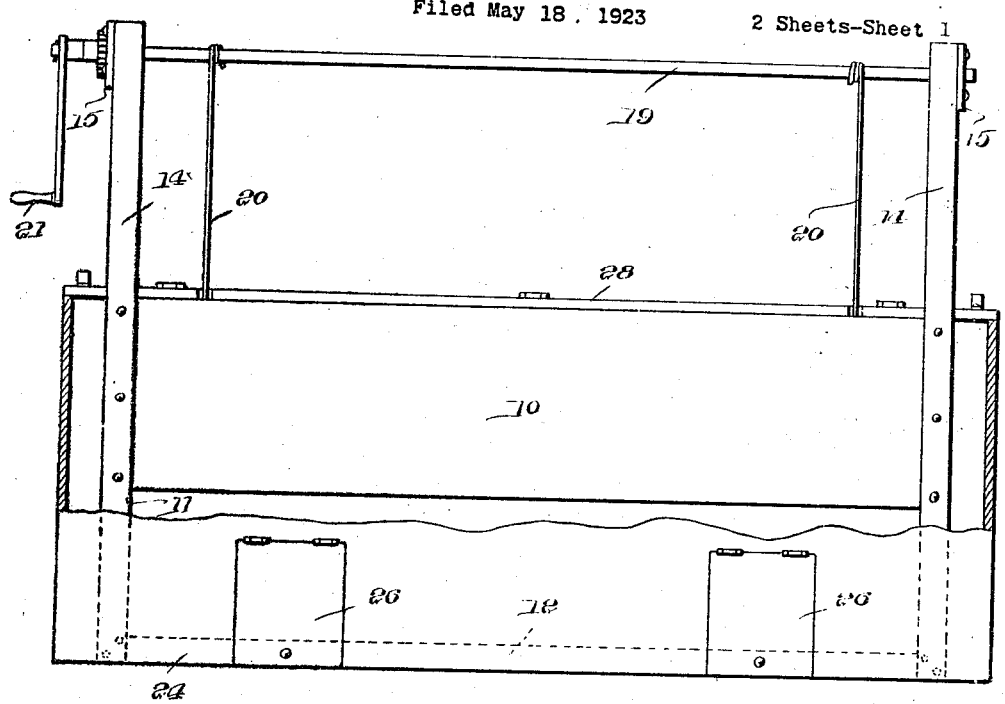
Figure 1 is a side elevation of the invention with the outer housing in section.
Figure 2:
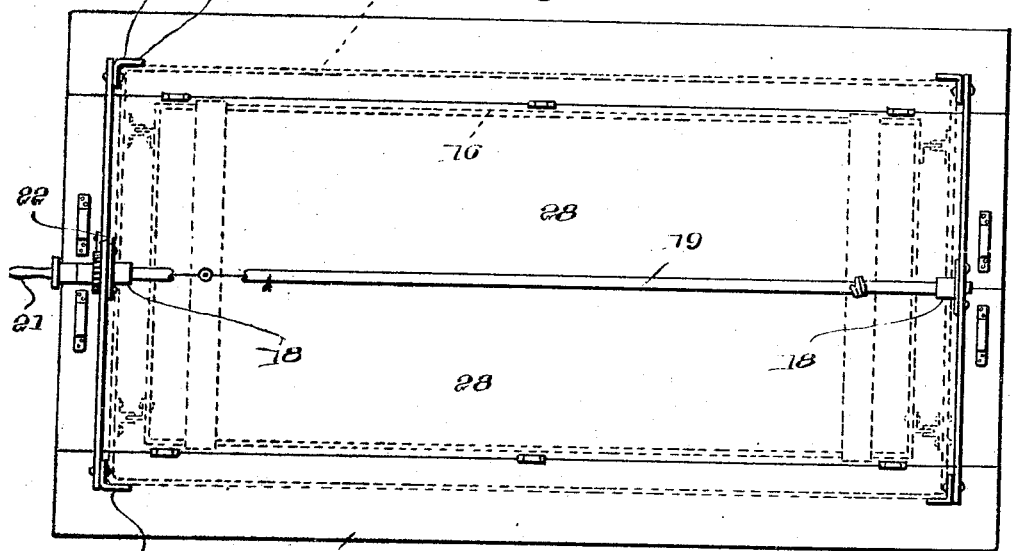
Figure 2 is a plan view.

Referring in detail to the drawings wherein like characters of reference denote corresponding parts, the reference character 10 indicates a liquid receptacle which may be made of any suitable material and is designed to contain a sufficient quantity of water for the purpose intended. This receptacle is preferably supported in elevated position and for this purpose is mounted upon legs 11. These legs are connected by longitudinal braces 12, and transverse braces 13, the latter forming supports upon which the receptacle 10 rests. The legs 11 are secured to the corners of the receptacle and extend upward to provide standards 14, the upper ends of which are connected by transverse beams 15.

The reference character 16 designates a grain receptacle which is provided with a perforated bottom 17, the perforations being of a size to prevent the passage of corn therethrough but to permit of the free circulation of water. If desired the perforations may be of a size to prevent the passage of oats or smaller grain when it is desired to treat the latter by soaking.

Mounted in bearings 18 provided in the beams 15 is a windlass 19 which is connected to the grain receptacle 16 by means of cables 20. This windlass is provided with an operating handle 21 and is held against retrograde movement by means of a pawl and ratchet 22.

Grain may be placed within the receptacle 16 and water within the receptacle 10 and after a proper period of soaking, the windlass may be operated to elevate the receptacle 16 and permit the grain to drain, after which it may be removed. To facilitate this removal, the receptacle 16 is provided with a pivoted end 23.

In cold weather it is desirable to heat the water and grain and for this purpose there is provided an outer housing 24 which is positioned around the receptacle 10 and which extends downwardly below the same so as to provide a compartment 25 beneath the liquid receptacle within which may be positioned suitable lamps or heaters (not shown). The housing 24 may be provided with doors 26 to permit access to the compartment 25.

A drain cock 27 extends through the housing 24 and into the receptacle 10 so that the latter may be conveniently emptied.

The receptacles may be closed by hinged lids or closures 28 and the latter are notched at each end as shown at 29 so as to receive the standards 14 and provide means for removably holding the lids or closures in place.

The invention is susceptible of various changes in its form, proportions and minor details of construction and the right is herein reserved to make such changes as properly fall within the scope of the appended claim.

Having described the invention what is claimed is:—

A grain soaking apparatus comprising a liquid receptacle supported upon pairs of legs extending above and below the same, longitudinal and transverse braces, a grain receptacle having a foraminous bottom normally seated within the liquid receptacle, a windlass mounted in bearings provided in the transverse braces secured to the upper end standards of the legs, means connecting the windlass and grain receptacle, means for operating the windlass and holding same against retrograde movement, an outer housing positioned around the receptacle adjacent its lower portion to provide a heating compartment, and hinged closures common to both receptacles and having notches in the side end thereof to receive the connecting means from the windlass.

In testimony whereof I affix my signature.

AILT J. KRUGER.